3,352,751
HEXACHLOROPHENE DERIVATIVES FOR TREATING FASCIOLIASIS

Antony M. Akkerman and Josephus F. Michels, Amsterdam, Netherlands, assignors to N.V. Nederlandsche Combinatie voor Chemische Industrie, Amsterdam, Netherlands, a limited-liability company of the Netherlands
No Drawing. Filed Sept. 30, 1963, Ser. No. 312,318
Claims priority, application Netherlands, Oct. 3, 1962, 283,922
8 Claims. (Cl. 167—53)

This invention relates to new hexachlorophene derivatives, to compositions containing them, and to methods of preparing both.

In the last few years hexachlorophene or 2,2'-methylene-bis(3,4,6-trichlorophenol) has come into use as an agent in combating parasites, especially in the fight against fascioliasis or liver-fluke, a disease from which particularly sheep and cattle are suffering.

However, as a therapeutic agent hexachlorophene has the drawback of being very sparingly soluble in water. This is one of the reasons why the results obtained with this remedy are rather varying, especially in sheep (see the thesis of W. Dorsman, "Contribution to the Control of Fascioliasis," Amsterdam, 1962, p. 70). These divergent outcomes may be explained by erratic and incomplete resorption of the compound from the gastro-intestinal tract, causing that a greater or lesser part of the active agent is excreted unused (compare K. Kok, paper, read at the second federative meeting of medical-biological societies, Leiden, Mar. 27–28, 1961; abstracted in acta physiol. pharmacol. neerl., 10, 283).

To obtain a well resorbable composition giving more uniform results, it is suggested in the above indicated thesis, which was published after the priority date of this application, to solubilize hexachlorophene with the aid of Tween 80.

It has been found that the difficulties described can be overcome also by converting hexachlorophene into the monophosphoric acid ester and using the latter compound and/or pharmacologically acceptable salts thereof in the fight against fascioliasis.

It is another object of the invention to provide soluble hexachlorophene derivatives, having about the same germicidal properties as the parent compound itself. Especially the dipotassium and disodium salts of the monophosphoric acid ester of hexachlorophene can be used as well soluble germicides.

The compounds according to the invention have never been described before. They can be prepared by methods known per se for analogous compounds.

A simple method exists in treating hexachlorophene with phosphoryl chloride, converting the cyclic phosphorochloridate obtained into hexachlorophene cyclic phosphate, and hydrolyzing the latter compound to the monophosphoric acid ester according to the invention (compare the method described by M. H. Maguire et al., J. Chem. Soc., 1953, 1479).

Hexachlorophene cyclic phosphate, obtained in the above described method, as well as its salts are new compounds too. They form part of the invention, being useful as intermediates in the production of the monophosphoric acid ester of hexachlorophene and its derivatives.

The monophosphoric acid ester of hexachlorophene and its pharmacologically acceptable salts can be administered to animals, suffering from parasitic diseases, in suitable thereapeutic dosage forms, such as tablets, pills, capsules and the like. For that purpose, the active component can be mixed with the usual pharmaceutical carriers as talc, magnesium stearate, amylum, lactose, etc.

Examples of suitable pharmacologically acceptable salts of the monophosphoric acid ester of hexachlorophene are, the mono- and disodium salts, the mono- and dipotassium salts, the monocalcium salt, the monoammonium salt, the monoethylenediamine salt and the monopiperazine salt.

Particularly useful are tablets containing in addition approximately equivalent amounts of sodium hydrogen carbonate, that is to say, for the monophosphoric acid ester of hexachlorophene about three equivalents, for the mono-salts about two equivalents and for the di-salts about one equivalent of sodium hydrogen carbonate.

As some of the ester-salts are soluble as such, it is also possible to prepare solutions of the active components for oral or parenteral administration.

It has further been found that a single dose of the active principles, corresponding to about 15–30 mg. of the monophosphoric acid ester of hexachlorophene per kg. body-weight is suitable to cause a very satisfactory reduction in the number of eggs present in the faeces of infected animals, and it has appeared that said dose kills all mature liver-flukes in experimental animals.

The above discussion of methods for the preparation of compounds according to the invention and anti-parasitically preparations containing them, as well as the following examples which further specify these general methods, are not to be construed as limiting the invention to the particular method, compound or preparation described.

Example 1

To a mixture of 50 grams of hexachlorophene and 125 ml. of phosphoryl chloride are added 300 mg. of magnesium oxide as a catalyst. Hereupon the mixture is boiled under reflux till the evolution of hydrogen chloride has stopped. The excess of phosphoryl chloride is evaporated in vacuo and the crystalline residue dissolved in 300 ml. of dry toluene. The solution obtained is filtered and the solvent removed again by distillation under reduced pressure. The residue, consisting of crystalline cyclic hexachlorophene phosphorochloridate, can be further purified by recrystallisation from ligroin (B.P. 80–110° C.).

The phosphorochloridate is added to a solution of 240 grams of sodium hydroxide in 200 ml. of water and the mixture is stirred for one hour at room temperature, yielding a thick slurry of the sodium salt of hexachlorophene cyclic phosphate. The compound formed can be sucked off, washed with water, dried, and recrystallized from a 1:4 mixture of dimethylformamide and water.

Alternatively, the slurry is heated to 110° C. under continuous stirring and, after the solution has become clear, kept at this temperature for another hour.

After cooling to 0° C., the solution is acidified to pH=1, with 2 N sulfuric acid.

The precipitate formed is extracted with ethyl acetate and the solution obtained is washed with water and dried over anhydrous sodium sulfate.

The volume of the solution is reduced in vacuo to about 100 ml., whereupon an equal volume of chloroform is added. The crystals obtained are filtered, washed with chloroform, and dried, yielding 58 grams of the monophosphoric acid ester of hexachlorophene expressed by the formula: $C_{13}H_4(OH)Cl_6.H_2PO_4$.

Example 2

Hexachlorophene cyclic phosphate can be obtained by dissolving 1 gram of its sodium salt in 100 ml. of boiling water with stirring, and adding the equivalent amount of 4 N hydrochloric acid. After cooling to room temperature, the crystals formed are filtered off and dried, yielding 0.8 gram of the acid, hexachlorophene cyclic phosphate.

Example 3

To a solution of 5 grams of the monophosphoric acid ester of hexachlorophene in 25 ml. of 0.8 N sodium hydroxide, 0.25 ml. of ethyl acetate are added. The mixture is stirred and at the same time acidified dropwise with 10% aqueous acetic acid till pH=4. The precipitate formed is sucked off, washed with water and dried, yielding crystalline acid sodium salt of hexachlorophene monophosphate. This compound is sparingly soluble in water.

Example 4

A solution of the disodium salt of hexachlorophene monophosphate is obtained by dissolving 2 grams of the monophosphoric acid ester of hexachlorophene in 16 ml. of 0.5 N sodium hydroxide.

Example 5

124 grams of the monophosphoric acid ester of hexachlorophene are intimately mixed with 60 grams of sodium hydrogen carbonate, 40 grams of amylum, 10 grams of talc, 5 grams of magnesium stearate and 161 grams of lactose. Hereupon the mixture is made into 100 tablets of 4 grams, each containing 1.24 grams of the active principle.

Example 6

140 grams of the acid sodium salt of hexachlorophene monophosphate are intimately mixed with 46 grams of sodium hydrogen carbonate, 40 grams of amylum, 10 grams of talc, 5 grams of magnesium stearate and 159 grams of lactose. The mixture is made into 100 tablets.

Example 7

To a solution of 5 grams of the monophosphoric acid ester of hexachlorophene in an excess of aqueous ammonia, is added with stirring an aqueous solution of 2 grams of calcium acetate. The precipitate formed is sucked off, washed with water and dried, yielding 5 grams of the monocalcium salt of the monophosphoric acid ester of hexachlorophene.

Example 8

To a solution of 5 grams of the monophosphoric acid ester of hexachlorophene in 200 ml. of methanol, a mixture of 2 ml. of 25% aqueous ammonia and 100 ml. of methanol is added. The crystals formed are sucked off and dried. The monoammonium salt of hexachlorophene monophosphate obtained is sparingly soluble in water.

Example 9

To a solution of 5 grams of the monophosphoric acid ester of hexachlorophene in 200 ml. of methanol, a solution of 0.8 gram of ethylenediamine hydrate in methanol is added. The crystals obtained consist of the monoethylenediamine salt of hexachlorophene monophosphate. Melting point 148–150° C.

Example 10

In the same way as described in Example 9, however substituting 2 grams of piperazine hydrate for 0.8 gram of ethylenediamine hydrate, the monopiperazine salt of hexachlorophene monophosphate is obtained.

In the following tables some results obtained with the compounds according to the invention are listed.

TABLE I

[Influence of a single oral dose of 18 mg./kg. of the acid sodium salt of hexachlorophene monophosphate (as tablets prepared according to Example 6) on the egg counts of liver-fluke infected cows.]

| Cow Number | Age in years | Estimated weight in kg. | Number of liver-fluke eggs per gram faeces | |
|---|---|---|---|---|
| | | | Before treatment | 1 month after treatment |
| 1 | 2 | 450 | 5 | 0 |
| 2 | 3 | 500 | 10 | 0 |
| 3 | 2 | 450 | 10 | 0 |
| 4 | 4 | 550 | 15 | 0 |
| 5 | 1 | 200 | 15 | 0 |
| 6 | 11 | 500 | 20 | 0 |
| 7 | 4 | 550 | 20 | 0 |
| 8 | 3 | 450 | 30 | 0 |
| 9 | 2 | 450 | 30 | 0 |
| 10 | 1 | 150 | 50 | 20 |
| 11 | 3 | 500 | 60 | 0 |
| 12 | 1 | 200 | 65 | 0 |
| 13 | 6 | 550 | 70 | 0 |
| 14 | 14 | 500 | 75 | 0 |
| 15 | 2 | 250 | 85 | 5 |

TABLE II

[Influence of oral administration of a solution of the disodium salt of hexachlorophene monophosphate on the egg counts of liver-fluke infected sheep (one dose containing 7.5 mg. of the active salt per kg. body-weight).]

| Sheep Number | Age in years | Weight in kg. | Number of liver-fluke eggs per gram faeces | |
|---|---|---|---|---|
| | | | Before treatment | 3 weeks after treatment |
| 1 | 3 | 59 | 5 | 0 |
| 2 | 1 | 68.5 | 55 | 20 |
| 3 | 1 | 66 | 90 | 0 |
| 4 | 1 | 67.5 | 150 | 0 |
| 5 | 1 | 63 | 380 | 10 |
| 6 | 1 | 65 | 580 | 10 |
| 7 | 1 | 64 | 895 | 20 |

TABLE III

[Influence of one oral administration of 50 ml. of an aqueous solution of the disodium salt of hexachlorophene monophosphate (25 mg./ml.) on the egg counts of liver-fluke infected sheep.]

| Sheep Number | Estimated weight in kg. | Number of liver-fluke eggs per gram faeces | |
|---|---|---|---|
| | | Before treatment | One month after treatment |
| 1 | 55 | 30 | 0 |
| 2 | 45 | 40 | 0 |
| 3 | 60 | 90 | 0 |
| 4 | 55 | 90 | 0 |
| 5 | 55 | 120 | 0 |
| 6 | 60 | 160 | 0 |
| 7 | 55 | 240 | 0 |
| 8 | 65 | 280 | 0 |
| 9 | 45 | 330 | 0 |
| 10 | 55 | 870 | 0 |

TABLE IV

[Influence of the oral administration of one tablet containing 1.40 grams of the acid sodium salt of hexachlorophene monophosphate on the egg counts of liver-fluke infected sheep (tablets prepared according to Example 6).]

| Sheep Number | Estimated weight in kg. | Number of liver-fluke eggs per gram faeces | |
|---|---|---|---|
| | | Before treatment | One month after treatment |
| 1 | 65 | 40 | 0 |
| 2 | 45 | 50 | 0 |
| 3 | 65 | 80 | 80 |
| 4 | 55 | 80 | 0 |
| 5 | 60 | 100 | 0 |
| 6 | 65 | 110 | 0 |
| 7 | 60 | 190 | 50 |
| 8 | 65 | 200 | 0 |
| 9 | 45 | 260 | 0 |
| 10 | 45 | 400 | 0 |
| 11 | 60 | 590 | 0 |
| 12 | 65 | 720 | 0 |

What is claimed is:

1. A compound selected from the class consisting of the monophosphoric acid ester of hexachlorophene and the pharmacologically acceptable salts thereof.

2. A compound selected from the class consisting of the dialkali metal salts of the monophosphoric acid ester of hexachlorophene.

3. A compound selected from the class consisting of hexachlorophene cyclic phosphate and the metal salts thereof.

4. A composition for combating fascioliasis in animals having as its essential active ingredient an effective amount of a compound selected from the class consisting of the monophosphoric acid ester of hexachlorophene and the pharmacologically acceptable salts thereof and a pharmaceutical carrier therefor.

5. A composition according to claim 4; further containing an amount of sodium hydrogen carbonate equivalent to the amount of said selected compound.

6. A method of treating animals infected with fascioliasis, consisting essentially in administering to an animal infected with fascioliasis therapeutically effective amounts of a composition having as its essential active ingredient a compound selected from the class consisting of the monophosphoric acid ester of hexachlorophene and the pharmacologically acceptable salts thereof.

7. A method of preparing the monophosphoric acid ester of hexachlorophene comprising the steps of reacting hexachlorophene with phosphoryl chloride to produce cyclic hexachlorophene phosphorochloridate, treating said phosphorochloridate with a strong base to obtain hexachlorophene cyclic phosphate, and treating said cyclic phosphate with a strong inorganic acid so as to hydrolyze the same to the monophosphoric acid ester of hexachlorophene.

8. A method as in claim 7; further comprising converting the product obtained into a pharmacologically acceptable salt thereof.

References Cited

UNITED STATES PATENTS 2,646,382   7/1953   Craige _____ 167—53

SAM ROSEN, *Primary Examiner.*